No. 770,430.

Patented September 20, 1904.

UNITED STATES PATENT OFFICE.

WILHELM HERZBERG AND OTTO SIEBERT, OF BERLIN, GERMANY, ASSIGNORS TO ACTIEN GESELLSCHAFT FÜR ANILIN FABRIKATION, OF BERLIN, GERMANY.

RED LAKE.

SPECIFICATION forming part of Letters Patent No. 770,430, dated September 20, 1904.

Application filed November 2, 1903. Serial No. 179,578. (Specimens.)

*To all whom it may concern:*

Be it known that we, WILHELM HERZBERG and OTTO SIEBERT, of Berlin, in the Kingdom of Prussia, German Empire, have invented new and useful Improvements in the Manufacture of Red Lakes; and we do hereby declare that the following is a full, clear, and exact description thereof, which will enable others skilled in the art to which it appertains to make and use the same.

We have discovered that the dyestuff which is obtained by combining with beta-naphthol the diazo compound of the para-amidophenol-alkyl ether meta-sulfonic acid of the following constitution:

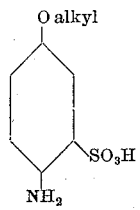

(in which the alkyl group may be $CH_3$ or $C_2H_5$) is of great value for the production of red lakes, and this invention relates to the manufacture of such lakes. For this purpose the alkali salt of the said dyestuff is suspended in water, a solution of metallic salts—as, for instance, a salt of barium, calcium, strontium, magnesium, or the oxid or hydroxid of one of these metals, or a mixture of such compounds—is added, either in the cold or while heating. Advantageously the precipitates obtained in this way are mixed with a suitable substratum, such as sulfate of calcium, hydroxid of aluminium, or the like. The lakes are then filtered and dried. They possess a very brilliant red color and are or of great fastness to water and light.

We describe the manner in which our invention may be carried out in the following examples without limiting ourselves to the proportions or materials given therein.

Example I: Ten parts of a paste containing twenty-five per cent. of the dyestuff obtained by combining para-diazoanisidin-meta-sulfonic acid with beta-naphthol are well mixed with five hundred parts of water warmed to 50°, and then an aqueous solution of two parts of crystallized barium chlorid is poured in. A paste of one hundred and fifty parts of aluminium hydroxid containing five per cent. is then added, while the mass is well stirred. The lake formed is well filtered, washed, dried, and well pulverized.

Example II: Ten parts of a paste of twenty-five per cent. of the dyestuff para-phenetidin-meta-sulfonic acid azo-beta-naphthol are suspended in about one hundred times their weight of water. The mixture is warmed to about 60°, and then the lake is formed by adding an aqueous solution of 2.5 parts of crystallized zinc sulfate. After a short time a paste of one hundred parts of aluminium hydroxid containing five per cent. is added, and after stirring for some time the lake obtained is filtered, washed, and dried.

Instead of the barium and zinc salts employed in the foregoing examples salts of strontium, calcium, magnesium, aluminium, or other metals or the oxids or hydroxids of the said metals may be used for the preparation of the lakes. The result is the same if for the alkali salts of the dyestuffs the free acids are substituted or if other substrata are used.

Having now described our invention and in what manner the same is to be carried out, what we claim as new is—

The new red-color lake prepared by converting the monoazo dyestuffs obtained by combining the diazo compound of para-amidophenol-alkylether-meta-sulfonic acid of the following constitution:

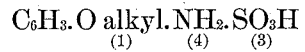

with beta-naphthol into an insoluble salt, in the presence of a lake base, said lake being distinguished by a brilliant red color, a practically perfect insolubility in water, alcohol oils and fats, being not altered by the action of strong alkalies, producing with concentrated sulfuric acid a red-violet coloration, substantially as described.

In witness whereof we have hereunto signed our names, this 16th day of October, 1903, in the presence of two subscribing witnesses.

WILHELM HERZBERG.
OTTO SIEBERT.

Witnesses:
WOLDEMAR HAUPT,
WILLIAM MAYNER.